United States Patent
Sasaki et al.

(10) Patent No.: US 12,162,769 B2
(45) Date of Patent: Dec. 10, 2024

(54) SILICA PARTICLES AND MANUFACTURING METHOD THEREOF

(71) Applicant: FUJIFILM Business Innovation Corp., Tokyo (JP)

(72) Inventors: Koji Sasaki, Kanagawa (JP); Sakae Takeuchi, Kanagawa (JP); Yuka Zenitani, Kanagawa (JP); Yoshifumi Eri, Kanagawa (JP); Mai Mochida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 265 days.

(21) Appl. No.: 17/586,750

(22) Filed: Jan. 27, 2022

(65) Prior Publication Data
US 2022/0306479 A1 Sep. 29, 2022

(30) Foreign Application Priority Data

Mar. 25, 2021 (JP) ................................ 2021-052447
Sep. 24, 2021 (JP) ................................ 2021-156198

(51) Int. Cl.
*C01B 33/18* (2006.01)

(52) U.S. Cl.
CPC .......... *C01B 33/18* (2013.01); *C01P 2004/62* (2013.01); *C01P 2004/64* (2013.01); *C01P 2006/14* (2013.01); *C01P 2006/17* (2013.01); *C01P 2006/90* (2013.01)

(58) Field of Classification Search
None
See application file for complete search history.

(56) References Cited

U.S. PATENT DOCUMENTS

2020/0348611 A1    11/2020  Yokota et al.
2022/0009784 A1*    1/2022  Shimizu .................. C01B 33/18

FOREIGN PATENT DOCUMENTS

| JP | H09166884 | | 6/1997 | | |
|---|---|---|---|---|---|
| JP | 2001194825 | | 7/2001 | | |
| JP | 2004045681 | A * | 2/2004 | | |
| JP | 2011185998 | | 9/2011 | | |
| JP | 2017039618 | | 2/2017 | | |
| JP | 2017142400 | A * | 8/2017 | ............ | C08F 212/08 |
| JP | 2019073418 | | 5/2019 | | |
| JP | 2020033224 | | 3/2020 | | |
| JP | 2021151944 | A * | 9/2021 | | |
| WO | WO-2020116307 | A1 * | 6/2020 | ............ | C01B 33/126 |

OTHER PUBLICATIONS

Machine translation of JP2017142400 (Year: 2017).*
Machine translation of JP2004045681 (Year: 2004).*
Translation of JP2021151944 (Year: 2021).*

* cited by examiner

Primary Examiner — Michael Forrest
(74) Attorney, Agent, or Firm — JCIPRNET

(57) ABSTRACT

Silica particles have silica base particles, a structure that covers at least a part of a surface of the silica base particles and is configured with a reaction product of a trifunctional silane coupling agent, and a nitrogen element-containing compound, in which a content of the nitrogen element-containing compound with respect to the silica particles is 0.005% by mass or more and 0.50% by mass or less in terms of N atoms, and the silica particles have a degree of hydrophobicity of 10% or more and 60% or less and a volume resistivity of $1 \times 10^8$ Ω·cm or more and $1 \times 10^{12.5}$ Ω·cm or less.

8 Claims, No Drawings

SILICA PARTICLES AND MANUFACTURING METHOD THEREOF

CROSS-REFERENCE TO RELATED APPLICATIONS

This application is based on and claims priority under 35 USC 119 from Japanese Patent Application No. 2021-156198 filed Sep. 24, 2021 and Japanese Patent Application No. 2021-052447 filed Mar. 25, 2021.

BACKGROUND

(i) Technical Field

The present invention relates to silica particles and a manufacturing method thereof.

(ii) Related Art

Silica particles are used as additive components or main components of powder paints, cosmetics, rubber, abrasives, and the like, and play the role of, for example, improving the strength of resins, improving the fluidity of powder, and suppressing packing.

For example, JP2019-073418A discloses "hydrophobic silica powder in which (1) a degree of hydrophobicity is 50% or more, (2) an extraction amount X of at least one compound selected from the group consisting of a quaternary ammonium ion, a monoazo-based complex, and a mineral ion by a mixed solvent of methanol and an aqueous methanesulfonic acid solution is 0.1% by mass or more, and (3) the X and an extraction amount Y of the above compound by water satisfy Expression (I) Y/X<0.15".

Furthermore, JP2017-039618A discloses "silica powder containing a plurality of silica particles composed of a silica structure having "Si—O" bond as a repeating unit and a quaternary ammonium salt introduced into the structure".

In addition, JP2011-185998A discloses "charge control particles to be used as an external additive configured with transport particles and a charge control agent having adhered to the surface of the transport particles, in which the transport particles are composed of hydrophobic spherical fine silica particles which are obtained by hydrophobizing the surface of hydrophilic spherical fine silica particles obtained by a sol-gel method and have an average particle size of 20 to 500 nm".

Furthermore, JP2001-194825A discloses "fine silica particles prepared by treating spherical hydrophobic fine silica particles having an average primary particle size of 0.01 to 5 μm with a compound selected from the group consisting of a quaternary ammonium salt compound, a fluoroalkyl group-containing betaine compound, and silicone oil".

Moreover, JP1997-166884A discloses "particles that are prepared by treating fine silica particles having a degree of hydrophobicity of 80% or more with an amphoteric surfactant and particles that are prepared by treating fine silica particles having a degree of hydrophobicity of 80% or more with a polymer having a quaternary ammonium salt or a quaternary ammonium group".

SUMMARY

Aspects of non-limiting embodiments of the present disclosure relate to silica particles that have a narrower charge distribution when charged, compared to silica particles having a structure in which a nitrogen element-containing compound is adsorbed onto silica base particles that do not have a structure configured with a reaction product of a trifunctional silane coupling agent, silica particles in which the content of a nitrogen element-containing compound is less than 0.005% by mass in terms of N atoms, silica particles having a degree of hydrophobicity of less than 10% or higher than 60%, or silica particles having a volume resistivity of higher than $1\times10^{12.5}\Omega$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specifically, non-limiting embodiments of the present disclosure include the following aspects.

According to an aspect of the present disclosure, there are provided silica particles having silica base particles, a structure that covers at least a part of a surface of the silica base particles and is configured with a reaction product of a trifunctional silane coupling agent, and a nitrogen element-containing compound, in which a content of the nitrogen element-containing compound with respect to the silica particles is 0.005% by mass or more and 0.50% by mass or less in terms of N atoms, and the silica particles have a degree of hydrophobicity of 10% or more and 60% or less and a volume resistivity of $1\times10^8$ Ω·cm or more and $1\times10^{12.5}$ Ω·cm or less.

DETAILED DESCRIPTION

The exemplary embodiments of the present invention will be described below. The following descriptions and examples merely illustrate the exemplary embodiments, and do not limit the scope of the exemplary embodiments.

Regarding the ranges of numerical values described in stages in the present specification, the upper limit or lower limit of a range of numerical values may be replaced with the upper limit or lower limit of another range of numerical values described in stages. Furthermore, in the present disclosure, the upper limit or lower limit of a range of numerical values may be replaced with values described in examples.

In the present specification, each component may include a plurality of corresponding substances.

In a case where the amount of each component in a composition is mentioned in the present specification, and there are two or more kinds of substances corresponding to each component in the composition, unless otherwise specified, the amount of each component means the total amount of two or more kinds of the substances present in the composition.

Silica Particles

The silica particles according to the present exemplary embodiment have silica base particles and a structure which covers at least a part of surface of the silica base particles and is configured with a reaction product of a trifunctional silane coupling agent.

The silica particles according to the present exemplary embodiment have the following characteristics (1) to (3).

(1) The silica particles contain a nitrogen element-containing compound, in which a content of the nitrogen element-containing compound with respect to the silica particles is 0.005% by mass or more and 0.50% by mass or less in terms of N atoms.

(2) The silica particles have a degree of hydrophobicity of 10% or more and 60% or less.

(3) The silica particles have a volume resistivity of $1\times10^8$ Ω·cm or more and $1\times10^{12.5}$ Ω·cm or less.

Due to the above configuration, the silica particles according to the present exemplary embodiment have a narrow charge distribution when charged. The reason is presumed as follows.

Silica particles have a strong tendency to be negatively charged and are sometimes excessively charged. Therefore, the silica particles have a wide charge distribution.

For example, in powder coating, a powder paint charged by a method, such as contact electrification or corona discharge, is jetted and electrostatically stuck to an object to be coated and then heated to form a coating film.

In a case where silica particles that have a wide charge distribution when charged are used as an external additive for the powder paint, variation occurs in the charge of the powder paint, which makes it difficult to stick a uniform amount of the powder paint to the object to be coated.

On the other hand, in a case where a nitrogen element-containing compound is incorporated into silica particles, it is possible to prevent the silica particles from carrying an excess of negative charge when charged. The nitrogen element-containing compound tends to be positively charged, and the silica particles containing the nitrogen element-containing compound cancel out the excess of negative charge and are inhibited from carrying the excess of negative charge. Therefore, the silica particles have a narrow charge distribution when charged.

However, because the nitrogen element-containing compound tends to be positively charged, in a case where this compound is incorporated into the outermost surface of silica particles, a negative charge distribution and a positive charge distribution widen.

Therefore, in the silica particles according to the present exemplary embodiment, the silica base particles are provided with a structure (for example, $SiO_{2/3}CH_3$ layer) configured with a reaction product of a trifunctional silane coupling agent, and a nitrogen element-containing compound is incorporated into the silica particles so that the content of the compound is 0.005% by mass or more and 0.50% by mass or less in terms of N atoms.

Furthermore, the degree of hydrophobicity is set to 10% or more and 60% or less, and the volume resistivity is reduced to be $1\times10^8$ Ω·cm or more and $1\times10^{12.5}$ Ω·cm or less, so that the silica particles are inhibited from being excessively charged.

Accordingly, the charge distribution is further narrowed by the nitrogen element-containing compound.

Presumably, for the above reasons, the silica particles according to the present exemplary embodiment may have a narrow charge distribution when charged.

In addition, for example, in a case where the silica particles according to the present exemplary embodiment are used as an external additive for a powder paint, a variation in charge is less likely to occur in the powder paint, and a uniform amount of the powder paint can be stuck to an object to be coated.

Hereinafter, the silica particles according to the present exemplary embodiment will be specifically described.

Configuration of Silica Particles

The silica particles according to the present exemplary embodiment have silica base particles and a structure which covers the surface of the silica base particles and is configured with a reaction product of a trifunctional silane coupling agent. Furthermore, it is preferable that, for example, the nitrogen element-containing compound be adsorbed onto at least a part of the pores of the reaction product of a trifunctional silane coupling agent.

In addition, in the silica particles according to the present exemplary embodiment, a hydrophobized structure may be on the surface of the structure which is configured with the reaction product of a trifunctional silane coupling agent.

Silica Base Particles

The silica base particles are silica particles on which the structure configured with the reaction product of a trifunctional silane coupling agent is to be formed.

Examples of the silica base particles include dry silica particles and wet silica particles.

Examples of the dry silica particles include silica by a combustion method (fumed silica) obtained by combustion of a silane compound and silica by a deflagration method obtained by explosive combustion of metallic silicon powder.

Examples of the wet silica particles include wet silica particles obtained by a neutralization reaction between sodium silicate and a mineral acid (silica by a precipitation method synthesized-aggregated under alkaline conditions, silica particles by a gelation method synthesized-aggregated under acidic conditions), colloidal silica particles obtained by alkalifying and polymerizing acidic silicate (silica sol particles), and silica particles by a sol-gel method obtained by the hydrolysis of an organic silane compound (for example, alkoxysilane).

Among these, as the silica base particles, from the viewpoint of charge distribution narrowing, for example, silica particles by a sol-gel method are preferable.

Reaction Product of Trifunctional Silane Coupling Agent

The adsorptive structure configured with the reaction product of a trifunctional silane coupling agent has a low density and a high affinity with a nitrogen element-containing compound. Therefore, this structure makes it easy for the nitrogen element-containing compound to be adsorbed onto the deep portions of pores and increases the amount (that is, content) of the nitrogen element-containing compound adsorbed. The adhesion of the nitrogen element-containing compound, which tends to be positively charged, to the surface of silica which tends to be negatively charged produces an effect of canceling out an excess of negative charge. In addition, because the nitrogen element-containing compound is adsorbed not onto the outermost surface of the silica particles but onto the inside of the low-density structure, the silica particles are prevented from carrying an excess of positive charge and thus having a wider charge distribution. Furthermore, because only an excess of negative charge is canceled out, the charge distribution is further narrowed.

Examples of the reaction product of a trifunctional silane coupling agent include a reaction product represented by General Formula (TA) in which $OR^2$ is substituted with a OH group, a reaction product obtained by the polycondensation of compounds represented by General Formula (TA) in which $OR^2$ is substituted with a OH group, and a reaction product obtained by the polycondensation of a compound represented by General Formula (TA) in which $OR^2$ is substituted with a OH group and a SiOH group of silica particles. In addition, the reaction product of a trifunctional silane coupling agent includes these reaction products in which all or some of these $OR^2$'s are substituted, and reaction products obtained by the polycondensation of all or some of the aforementioned compounds.

The trifunctional silane coupling agent is a non-nitrogen element-containing compound that does not contain N (nitrogen).

Specifically, examples of the trifunctional silane coupling agent include a trifunctional silane coupling agent represented by General Formula (TA).

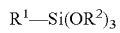  General formula (TA)

In General Formula (TA), $R^1$ represents a saturated or unsaturated aliphatic hydrocarbon group having 1 or more and 20 or less carbon atoms or an aromatic hydrocarbon group having 6 or more and 20 or less carbon atoms, and $R^2$ represents a halogen atom or an alkoxy group. The plurality of $R^2$'s may be the same group or different groups.

The aliphatic hydrocarbon group represented by $R^1$ may be linear, branched, or cyclic. The aliphatic hydrocarbon group is, for example, preferably linear or branched. The number of carbon atoms in the aliphatic hydrocarbon group is, for example, preferably 1 or more and 20 or less, more preferably 1 or more and 18 or less, even more preferably 1 or more and 12 or less, and still more preferably 1 or more and 10 or less. The aliphatic hydrocarbon group may be saturated or unsaturated. The aliphatic hydrocarbon group is, for example, preferably a saturated aliphatic hydrocarbon group, and more preferably an alkyl group.

Examples of the saturated aliphatic hydrocarbon group include a linear alkyl group (such as a methyl group, an ethyl group, a propyl group, a butyl group, a pentyl group, a hexyl group, a heptyl group, an octyl group, a nonyl group, a decyl group, a dodecyl group, a hexadecyl group, or an eicosyl group), a branched alkyl group (such as an isopropyl group, an isobutyl group, an isopentyl group, a neopentyl group, a 2-ethylhexyl group, a tertiary butyl group, a tertiary pentyl group, or an isopentadecyl group), a cyclic alkyl group (such as a cyclopropyl group, a cyclopentyl group, a cyclohexyl group, a cycloheptyl group, a cyclooctyl group, a tricyclodecyl group, a norbornyl group, or an adamantyl group), and the like.

Examples of the unsaturated aliphatic hydrocarbon group include an alkenyl group (such as a vinyl group (ethenyl group), a 1-propenyl group, a 2-propenyl group, a 2-butenyl group, a 1-butenyl group, a 1-hexenyl group, a 2-dodecenyl group, or a pentenyl group), an alkynyl group (such as an ethynyl group, a 1-propynyl group, a 2-propynyl group, a 1-butynyl group, a 3-hexynyl group, or a 2-dodecynyl group), and the like.

The number of carbon atoms in the aromatic hydrocarbon group represented by $R^1$ is, for example, preferably 6 or more and 20 or less, more preferably 6 or more and 18 or less, even more preferably 6 or more and 12 or less, and still more preferably 1 or more and 10 or less.

Examples of the aromatic hydrocarbon group include a phenylene group, a biphenylene group, a terphenylene group, a naphthalene group, an anthracene group, and the like.

Examples of the halogen atom represented by $R^2$ include a fluorine atom, a chlorine atom, a bromine atom, an iodine atom, and the like. As the halogen atom, for example, a chlorine atom, a bromine atom, or an iodine atom is preferable.

Examples of the alkoxy group represented by $R^2$ include an alkoxy group having 1 or more and 10 or less carbon atoms (for example, preferably having 1 or more and 8 or less carbon atoms, and more preferably having 1 or more and 4 or less carbon atoms). Examples of the alkoxy group include a methoxy group, an ethoxy group, an isopropoxy group, a t-butoxy group, an n-butoxy group, a n-hexyloxy group, a 2-ethylhexyloxy group, a 3,5,5-trimethylhexyloxy group, and the like. The alkoxy group also includes a substituted alkoxy group. Examples of substituents with which the alkoxy group can be substituted include a halogen atom, a hydroxyl group, an amino group, an alkoxy group, an amide group, a carbonyl group, and the like.

The trifunctional silane coupling agent represented by General Formula (TA) is, for example, preferably a trifunctional silane coupling agent in which $R^1$ represents a saturated aliphatic hydrocarbon group having 1 or more and 20 or less carbon atoms, and $R^2$ represents a halogen atom or an alkoxy group.

Examples of the trifunctional silane coupling agent include vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (these are compounds in which $R^1$ represents an unsubstituted aliphatic hydrocarbon group or an unsubstituted aromatic hydrocarbon group);

3-glycidoxypropyltrimethoxysilane, γ-methacryloxypropyltrimethoxysilane, γ-mercaptopropyltrimethoxysilane, γ-chloropropyltrimethoxysilane, and γ-glycidyloxypropylmethyldimethoxysilane (these are compounds in which $R^1$ represents a substituted aliphatic hydrocarbon group or a substituted aromatic hydrocarbon group); and the like.

One trifunctional silane coupling agent may be used alone, or two or more trifunctional silane coupling agents may be used in combination.

Among these, from the viewpoint of charge distribution narrowing, as the trifunctional silane coupling agent, for example, alkyl trifunctional silane coupling agent is preferable, and alkyl trifunctional silane coupling agent represented by General Formula (TA) is more preferable in which $R^1$ represents an alkyl group having 1 or more and 20 or less (for example, preferably 1 or more and 15 or less) carbon atoms and $R^2$ represents an alkyl group having 1 or more and 2 or less carbon atoms.

From the viewpoint of charge distribution narrowing, the amount of the adhering structure, which is configured with the reaction product of a trifunctional silane coupling agent, with respect to the amount of the silica base particles is, for example, preferably 0.005% by mass or more and 0.5% by mass or less, and more preferably 0.005% by mass or more and 0.2% by mass or less.

Nitrogen Element-Containing Compound

The nitrogen element-containing compound is a nitrogen element-containing compound, excluding ammonia and a compound that is in a gaseous state at a temperature of −200° C. or higher and 25° C. or lower.

It is preferable that the nitrogen element-containing compound be adsorbed, for example, onto at least a part of the pores of the reaction product of a trifunctional silane coupling agent.

Examples of the nitrogen element-containing compound include at least one compound selected from the group consisting of a quaternary ammonium salt, a primary amine compound, a secondary amine compound, a tertiary amine compound, an amide compound, an imine compound, and a nitrile compound.

Examples of the primary amine compound include phenethylamine, toluidine, catecholamine, and 2,4,6-trimethylaniline.

Examples of the secondary amine compound include dibenzylamine, 2-nitrodiphenylamine, and 4-(2-octylamino) diphenylamine.

Examples of the tertiary amine compound include 1,8-bis(dimethylamino)naphthalene, N,N-dibenzyl-2-aminoethanol, and N-benzyl-N-methylethanolamine.

Examples of the amide compound include N-cyclohexyl-p-toluenesulfonamide, 4-acetamide-1-benzylpiperidine, and N-hydroxy-3-[1-(phenylthio)methyl-1H-1,2,3-triazol-4-yl] benzamide.

Examples of the imine compound include diphenylmethaneimine, 2,3-bis(2,6-diisopropylphenylimino)butane, and N,N'-(ethane-1,2-diylidene)bis(2,4,6-trimethylaniline).

Examples of the nitrile compound include 3-indoleacetonitrile, 4-[(4-chloro-2-pyrimidinyl)amino]benzonitrile, and 4-bromo-2,2-diphenylbutyronitrile.

Among these, from the viewpoint of charge distribution narrowing, for example, a quaternary ammonium salt is preferable as the nitrogen element-containing compound.

One quaternary ammonium salt may be used alone, or two or more such compounds may be used in combination.

The quaternary ammonium salt is not particularly limited, and known quaternary ammonium salts can be used.

From the viewpoint of charge distribution narrowing, the quaternary ammonium salt preferably includes, for example, a compound represented by the general formula (AM). One compound represented by General Formula (AM) may be used alone, or two or more such compounds may be used in combination.

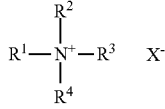

General Formula (AM)

In General Formula (AM), $R^1$, $R^2$, $R^3$, and $R^4$ each independently represent a hydrogen atom or an alkyl, aralkyl, or aryl group which may have a substituent, and $X^-$ represents an anion. Here, at least one of $R^1$, $R^2$, $R^3$, or $R^4$ represents an alkyl, aralkyl, or aryl group which may have a substituent. Furthermore, two or more of $R^1$, $R^2$, $R^3$, and $R^4$ may be linked to form an aliphatic ring, an aromatic ring, or a heterocycle.

Examples of the alkyl group represented by $R^1$ to $R^4$ include a linear alkyl group having 1 or more and 20 or less carbon atoms and a branched alkyl group having 3 or more and 20 or less carbon atoms.

Examples of the linear alkyl group having 1 or more and 20 or less carbon atoms include a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, and the like.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, and the like.

Among the above, as the alkyl group represented by $R^1$ to $R^4$, for example, an alkyl group having 1 or more and 15 or less carbon atoms, such as a methyl group, an ethyl group, a butyl group, or a tetradecyl group, is preferable.

Examples of the aralkyl group represented by $R^1$ to $R^4$ include an aralkyl group having 7 or more and 30 or less carbon atoms.

Examples of the aralkyl group having 7 or more and 30 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, a phenyl-cyclopentylmethyl group, and the like.

Among the above, as the aralkyl group represented by $R^1$ to $R^4$, for example, an aralkyl group having 7 or more and 15 or less carbon atoms, such as a benzyl group, a phenylethyl group, a phenylpropyl group, or a 4-phenylbutyl group, is preferable.

Examples of the aryl group represented by $R^1$ to $R^4$ include an aryl group having 6 or more and 20 or less carbon atoms.

Examples of the aryl group having 6 to 20 carbon atoms include a phenyl group, a pyridyl group, a naphthyl group, and the like.

Among the above, as the aryl group represented by $R^1$ to $R^4$, for example, an aryl group having 6 or more and 10 or less carbon atoms, such as a phenyl group, is preferable.

Examples of the anion represented by $X^-$ include an organic anion and an inorganic anion.

Examples of the organic anion include a polyfluoroalkylsulfonate ion, a polyfluoroalkylcarboxylate ion, a tetraphenylborate ion, an aromatic carboxylate ion, an aromatic sulfonate ion (such as a 1-naphthol-4-sulfonate ion), and the like.

Examples of the inorganic anion include molybdate ions (such as $MoO_4^{2-}$, $Mo_2O_7^{2-}$, $Mo_3O_{10}^{2-}$, $Mo_4O_{13}^{2-}$, $Mo_7O_{24}^{2-}$, or $Mo_8O_{26}^{4-}$), $OH^-$, $F^-$, $Fe(CN)_6^{3-}$, $Cl^-$, $Br^-$, $NO_2^-$, $NO_3^-$, $CO_3^{2-}$, $PO_4^{3-}$, $SO_4^{2-}$, and the like.

In General Formula (AM), two or more of $R^1$, $R^2$, $R^3$, and $R^4$ may be linked to each other to form a ring. Examples of the ring formed of two or more of $R^1$, $R^2$, $R^3$, and $R^4$ linked to each other include an alicyclic ring having 2 or more and 20 or less carbon atoms, a heterocyclic amine having 2 or more and 20 or less carbon atoms, and the like.

In the compound represented by General Formula (AM), $R^1$, $R^2$, $R^3$, and $R^4$ may each independently have a substituent. Examples of the substituent include a nitrile group, a carbonyl group, an ether group, an amide group, a siloxane group, a silyl group, an alkoxysilane group, and the like.

It is preferable that $R^1$, $R^2$, $R^3$, and $R^4$ each independently represent, for example, an alkyl group having 1 or more and 16 or less carbon atoms, an aralkyl group having 7 or more and 10 or less carbon atoms, or an aryl group having 6 or more and 20 or less carbon atoms.

Among these, from the viewpoint of charge distribution narrowing, the total number of carbon atoms in the compound represented by General Formula (AM) is, for example, preferably 18 or more and 35 or less, and more preferably 20 or more and 32 or less.

Examples of structures other than X⁻ in the compound represented by General Formula (AM) will be shown below, but the present exemplary embodiment is not limited thereto.

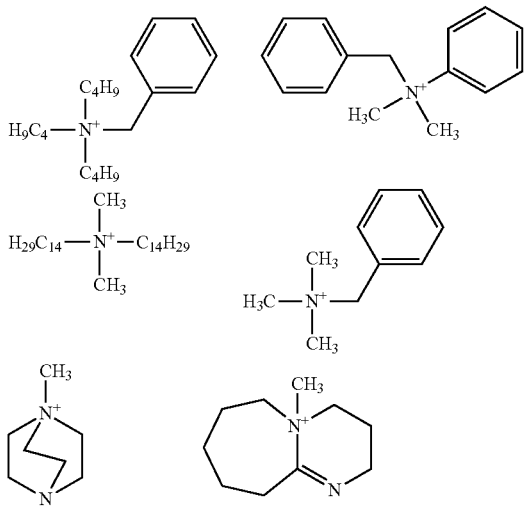

As the nitrogen element-containing compound, from the viewpoint of charge distribution narrowing and charge distribution retentivity, for example, a nitrogen element-containing compound containing a molybdenum element is preferable, and at least one compound selected from the group consisting of a quaternary ammonium salt containing a molybdenum element (particularly, a salt of quaternary ammonium containing a molybdenum element) and a mixture of a quaternary ammonium salt and a metal oxide containing a molybdenum element is more preferable.

In a case where the nitrogen element-containing compound contains a molybdenum element, the activity of the nitrogen element is enhanced. Therefore, even though the nitrogen element-containing compound is not on the outermost surface of the silica particles but on the inside of pores, the positive chargeability of the nitrogen element can be appropriately exhibited. Therefore, the silica particles have a narrow charge distribution when charged and are likely to exhibit high charge distribution retentivity.

Especially, in the salt of quaternary ammonium containing a molybdenum element, a strong bond is formed between a molybdenum element-containing anion as a negative ion and a quaternary ammonium cation as a positive ion. Therefore, the charge distribution retentivity is improved.

Specifically, examples of the quaternary ammonium salt containing molybdenum element include [N⁺ (CH)₃ (C₁₄C₂₉)₂]₄, Mo₈O₂₈⁴⁻, [N⁺ (C₄H₉)₂(C₆H₆)₂]₂Mo₂O₇²⁻, [N⁺ (CH₃)₂(CH₂C₆H₆)(CH₂)₁₇CH₃]₂MoO₄²⁻, [N⁺ (CH₃)₂ (CH₂C₆H₆)(CH₂)₁₅CH₃]₂MoO₄²⁻, and the like.

Examples of the metal oxide containing a molybdenum element include a molybdenum oxide (molybdenum trioxide, molybdenum dioxide, or Mo₉O₂₆), a molybdic acid alkali metal salt (such as lithium molybdate, sodium molybdate, or potassium molybdate), a molybdenum alkaline earth metal salt (such as magnesium molybdate or calcium molybdate) and other composite oxides (such as Bi₂O₃·2MoO₃ or γ-Ce₂Mo₃O₁₃).

The content of the nitrogen element-containing compound with respect to the amount of silica particles is 0.005% by mass or more and 0.50% by mass or less in terms of N atoms. From the viewpoint of narrowing charge distribution, the content of the nitrogen element-containing compound is, for example, preferably 0.015% by mass or more and 0.20% by mass or less, and more preferably 0.018% by mass or more and 0.10% by mass or less.

The content of the nitrogen element-containing compound in terms of N atoms is measured as follows.

By using an oxygen·nitrogen analyzer (for example, EMGA-920 manufactured by HORIBA, Ltd.), a sample is measured for a total of 45 seconds, thereby obtaining the abundance of a nitrogen element as a ratio of N (N/Si). As a pretreatment, the sample is dried in a vacuum dryer for 24 hours or more at 100° C. so that impurities such as ammonia are removed from the silica particles.

In a case where the nitrogen element-containing compound containing a molybdenum element is used as a nitrogen element-containing compound, from the viewpoint of charge distribution narrowing, a ratio (Mo/Si) of Net intensity of the molybdenum element to Net intensity of a silicon element measured by X-ray fluorescence analysis is, for example, preferably 0.035 or more and 0.35 or less, more preferably 0.07 or more and 0.32 or less, and even more preferably 0.10 or more and 0.30 or less.

From the viewpoint of charge distribution narrowing, Net intensity of the molybdenum element is, for example, preferably 5 kcps or more and 75 kcps or less, 7 kcps or more and 50 kcps or less, 8 kcps or more and 55 kcps or less, or 10 kcps or more and 40 kcps or less.

Net intensity of the molybdenum element and the silicon element is measured as follows.

Approximately 0.5 g of silica particles are compressed using a compression molding machine by being pressed under a load of 6 tons for 60 seconds, thereby preparing a disk having a diameter of 50 mm and a thickness of 2 mm. This disk is used as a sample for qualitative quantitative elemental analysis performed under the following conditions by using a scanning X-ray fluorescence spectrometer (XRF-1500, manufactured by Shimadzu Corporation), and Net intensity of each of the molybdenum element and the silicon element is determined (unit: kilo counts per second, kcps).

Tube voltage: 40 kV
Tube current: 90 mA
Measurement area (analysis diameter): diameter of 10 mmcp
Measurement time: 30 minutes
Anticathode: Rhodium Extraction Amount of Nitrogen Element-Containing Compound An extraction amount X of the nitrogen element-containing compound by a mixed solution of ammonia/methanol is, for example, 0.1% by mass or more. It is preferable that the extraction amount X of the nitrogen element-containing compound and an extraction amount Y of the nitrogen element-containing compound by water satisfy, for example, Expression: Y/X<0.3.

That is, a nitrogen element-containing compound tends to be poorly soluble in water, that is, is difficult to adsorb moisture in the air.

In the silica particles containing a nitrogen element-containing compound, in a case where the nitrogen element-containing compound adsorbs moisture, the charge distribution widens, and the nitrogen element-containing compound is easily detached from the silica particles.

However, the silica particles containing a nitrogen element-containing compound is difficult to adsorb moisture in the air are unlikely to have a wider charge distribution even though there is a large amount of moisture in the air (even under high humidity) and unlikely to experience the detachment of the nitrogen element-containing compound, and easily retain a narrow charge distribution.

The extraction amount X of the nitrogen element-containing compound is, for example, preferably 50% by mass. Here, the upper limit of the extraction amount X of the nitrogen element-containing compound is, for example, 95% by mass or less, because it is difficult for a solution to permeate the pores due to surface tension and thus a part of the nitrogen element-containing compound remains undissolved.

The ratio "Y/X" of the extraction amount Y of the nitrogen element-containing compound to the extraction amount X of the nitrogen element-containing compound is, for example, preferably less than 0.3. Here, ideally, the lower limit of the ratio "Y/X" is 0. However, because measurement error in a range of about ±1% occurs for X and Y, the lower limit is, for example, 0.01 or more.

Herein, the extraction amounts X and Y of the nitrogen element-containing compound are measured as follows.

First, the silica particles to be measured are analyzed with a thermogravimetric analyzer (for example, a gas chromatograph mass spectrometer manufactured by Netch Japan Co., Ltd.) at a constant temperature of 400° C., the mass fractions of compounds in which a hydrocarbon having one or more carbon atoms forms a covalent bond with a nitrogen atom to the silica particles are added up and adopted as W1.

On the other hand, 1 part by mass of the silica particles to be measured are added to 30 parts by mass of an ammonia/methanol solution (manufactured by Sigma-Aldrich Co., LLC, mass ratio of ammonia/methanol=1/5.2) at a liquid temperature of 25° C. and treated with ultrasonic waves for 30 minutes, and then silica powder and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W2.

Thereafter, the extraction amount X of the nitrogen element-containing compound is calculated by the following equation.

$$X = W1 - W2 \quad \text{Equation}$$

Furthermore, 1 part by mass of the silica particles to be measured are added to 30 parts by mass of water having a liquid temperature of 25° C. and treated with ultrasonic waves for 30 minutes, and then the silica particles and an extract are separated. The separated silica particles are dried in a vacuum dryer at 100° C. for 24 hours. Then, by using a thermogravimetric analyzer, the mass fractions of compounds in which a hydrocarbon having at least one or more carbon atoms forms a covalent bond with a nitrogen atom to the silica particles are measured at a constant temperature of 400° C. and adopted as W3.

Thereafter, the extraction amount Y of the nitrogen element-containing compound is calculated by the following equation.

$$Y = W1 - W3 \quad \text{Equation}$$

Hydrophobized Structure

The hydrophobized structure is a structure that has had a reaction with a hydrophobing agent.

As the hydrophobing agent, for example, an organosilicon compound is used.

Examples of the organosilicon compound include
an alkoxysilane compound or a halosilane compound having a lower alkyl group, such as methyltrimethoxysilane, dimethyldimethoxysilane, trimethylchlorosilane, or trimethylmethoxysilane;
an alkoxysilane compound having a vinyl group, such as vinyltrimethoxysilane or vinyltriethoxysilane;
an alkoxysilane compound having an epoxy group, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, or 3-glycidoxypropyltriethoxysilane;
an alkoxysilane compound having a styryl group, such as p-styryltrimethoxysilane or p-styryltriethoxysilane;
an alkoxysilane compound having an aminoalkyl group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, or N-phenyl-3-aminopropyltrimethoxysilane;
an alkoxysilane compound having an isocyanate alkyl group, such as 3-isocyanatepropyltrimethoxysilane or 3-isocyanatepropyltriethoxysilane;
a silazane compounds such as hexamethyldisilazane or tetramethyldisilazane;
and the like.

Characteristics of Silica Particles

Degree of Hydrophobicity

A degree of hydrophobicity of the silica particles according to the present exemplary embodiment is 10% or more and 60% or less. From the viewpoint of charge distribution narrowing, the degree of hydrophobicity is, for example, more preferably 20% or more and 55% or less, and even more preferably 28% or more and 53% or less.

In a case where the degree of hydrophobicity of the silica particles is 10% or less, the silica particles are covered with a small amount of the structure due to the reaction caused by the trifunctional silane coupling agent, and the content of the nitrogen element-containing compound is reduced. As a result, the charge distribution easily widens.

On the other hand, in a case where the degree of hydrophobicity of the silica particles is higher than 60%, the density of the structure increases due to the reaction caused by the trifunctional silane coupling agent, the number of pores decreases, and the content of the nitrogen element-containing compound is reduced. Therefore, the charge distribution easily widens.

The degree of hydrophobicity of the silica particles is measured as follows.

As a sample, 0.2% by mass of silica particles are added to 50 ml of deionized water. While the mixture is being stirred with a magnetic stirrer, methanol is added dropwise thereto from a burette, and the mass fraction of methanol in the mixed solution of methanol/water at a point in time when the entirety of the sample is precipitated is determined and adopted as a degree of hydrophobicity.

Amount of OH Groups

In the silica particles according to the present exemplary embodiment, the amount of OH groups measured by the Sears method is, for example, preferably 0.05 OH groups/$nm^2$ or more and 5 OH groups/$nm^2$ or less. From the viewpoint of charge distribution narrowing, the amount of OH group is, for example, more preferably 0.1 OH groups/$nm^2$ or more and 4 OH groups/$nm^2$ or less, and even more preferably 0.2 OH groups/$nm^2$ or more and 3 OH groups/$nm^2$ or less.

In a case where the structure configured with the reaction product of a trifunctional silane coupling agent is sufficiently formed on the silica base particles, the amount of OH groups measured by the Sears method can be adjusted and fall into the above range.

In a case where the amount of OH groups that inhibit the adsorption of the nitrogen element-containing compound is reduced and falls into the above range, the nitrogen element-containing compound can easily permeate deep into the pores of the structure of the silica particles. Furthermore, the hydrophobic interaction with the nitrogen element-containing compound works, and the adhesion of this compound to the silica particles becomes stronger. Therefore, the amount of the nitrogen element-containing compound adsorbed increases. In addition, the nitrogen element-containing compound is less likely to be detached. As a result, due to the nitrogen element-containing compound, the charge distribution is further narrowed, and the retentivity of the narrow charge distribution is further improved.

Furthermore, in a case where the amount of OH groups is reduced and falls into the above range, the environmental dependence of the charging characteristics is reduced. Therefore, in any environment, the charge distribution can be easily narrowed by the nitrogen element-containing compound.

The amount of OH groups is measured by the Sears method. Specifically, the method is as follows.

Silica particles (1.5 g) are added to a mixed solution of 50 g of pure water and 50 g of ethanol, and the mixture is stirred with an ultrasonic homogenizer for 2 minutes, thereby preparing a dispersion. While the dispersion is being stirred in an environment at 25° C., 1.0 g of a 0.1 mol/L aqueous hydrochloric acid solution is added dropwise thereto, thereby obtaining a test liquid. The obtained test liquid is put in an automatic titration device, potentiometric titration using a 0.01 mol/L aqueous sodium hydroxide solution is performed, and a differential curve of the titration curve is created. In the inflection point where the differential value of the titration curve is 1.8 or more, the titration amount by which the titration amount of the 0.01 mol/L aqueous sodium hydroxide solution is maximized is denoted by E.

The surface silanol group density p (number of silanol groups/$nm^2$) of the silica particles is calculated using the following equation.

$$\rho = ((0.01 \times E - 0.1) \times NA/1{,}000)/(M \times S_{BET} \times 10^{18})$$ Equation E: titration amount by which the titration amount of the 0.01 mol/L aqueous sodium hydroxide solution is maximized in the inflection point where the differential value of the titration curve is 1.8 or more.
NA: Avogadro's number
M: Amount of silica particles (1.5 g)
$S_{BET}$: Specific surface area of silica particles ($m^2/g$)
the specific surface area of silica particles is measured by the three-point BET nitrogen adsorption method. The relative equilibrium pressure is 0.3.

Volume Resistivity

The volume resistivity of the silica particles according to the present exemplary embodiment is $1 \times 10^8$ Ω·cm or more and $1 \times 10^{12.5}$ Ω·cm or less. From the viewpoint of charge distribution narrowing, the volume resistivity is, for example, preferably $1.0 \times 10^8$ Ω·cm or more and $1.0 \times 10^{11.5}$ Ω·cm or less, and even more preferably $1.0 \times 10^9$ Ω·cm or more and $1.0 \times 10^{11.0}$ Ω·cm or less.

In a case where the volume resistivity is reduced and falls into the above range, the silica particles are inhibited from being excessively charged. Therefore, the charge distribution is further narrowed.

The volume resistivity can be adjusted by the content of the nitrogen element-containing compound.

The volume resistivity is measured as follows. The volume resistivity is measured in an environment at a temperature of 20° C. and a humidity of 50% RH.

Silica particles to be measured are placed on the surface of a circular jig on which a 20 $cm^2$ electrode plate is disposed, so that a silica particle layer having a thickness of about 1 mm or more and 3 mm or less is formed. The same 20 $cm^2$ electrode plate as described above is placed on the silica particle layer so that the silica particle layer is sandwiched between the electrode plates. In order to eliminate voids between the silica particles, a pressure of 0.4 MPa is applied on the electrode plate placed on the silica particle layer, and then the thickness (cm) of the silica particle layer is measured. Both the electrodes placed on and under the silica particle layer are connected to an impedance analyzer (I manufactured by Solartron Analytical). Resistance is measured at a frequency of $10^{-3}$ Hz or more and $10^6$ Hz or less, thereby obtaining a Nyquist plot. On the assumption that there are three resistance components, bulk resistance, particle interface resistance, and electrode contact resistance, the plot is fitted to an equivalent circuit, and a bulk resistance R is determined.

The volume resistivity of silica particles (Ω·cm) is calculated by the following equation.

$$\rho = R/L$$ Equation

In the equation, ρ represents volume resistivity (Ω·cm) of silica particles, R represents bulk resistance (Ω), and L represents the thickness (cm) of the silica particle layer.

Pore Volume

The silica particles according to the present exemplary embodiment, for example, preferably have a first peak in a range of pore diameter of 0.01 nm or more and 2 nm or less and a second peak in a range of pore diameter of 1.5 nm or more and 50 nm or less, more preferably have a second peak in a range of pore diameter of 2 nm or more and 50 nm or less, even more preferably have a second peak in the range of pore diameter of 2 nm or more and 40 nm or less, and particularly preferably have a second peak in a range of pore diameter of 2 nm or more and 30 nm or less.

In a case where the first and second peaks appear in the aforementioned range of pore diameter in a pore size distribution curve of a nitrogen adsorption method, the nitrogen element-containing compound can easily permeate deep into the pores of the structure and can be easily adsorbed onto the pores. As a result, the charge distribution is further narrowed.

The pore size distribution curve of a nitrogen gas adsorption method is derived from an adsorption isotherm, which is obtained by measuring the amount of adsorbed nitrogen gas, by various calculation formulas.

First, the silica particles to be measured are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From this adsorption isotherm, a pore size distribution curve in which the ordinate shows a frequency and the abscissa shows a pore diameter is obtained by the equation of the BJH method.

Then, from the obtained pore size distribution curve, an integrated pore volume distribution in which the ordinate shows a volume and the abscissa shows a pore diameter is obtained, and the position of peak of the pore diameter is checked.

Method for detecting structure in which nitrogen element-containing compound is adsorbed onto at least a part of pores of reaction product of trifunctional silane coupling agent In a case where a nitrogen element-containing compound is adsorbed onto at least a part of pores of the reaction product of a trifunctional silane coupling agent, the nitrogen element-containing compound is detected when the silica particles are heated in a temperature range of 300° C. or higher and 600° C. or lower, and the pore volume of pores having a diameter of 1 nm or more and 50 nm or less determined from the pore size distribution curve of the nitrogen adsorption method before and after baking at 350° C. increases. Based on these characteristics, the adsorbed nitrogen element-containing compound is detected. Specifically, the method is as follows.

For detecting the nitrogen element-containing compound, for example, a heating furnace-type drop-type pyrolysis gas chromatograph mass spectrometer using He as a carrier gas is used. The nitrogen element-containing compound can be detected in an inert gas under the condition of a pyrolysis temperature of 300° C. or higher and 600° C. or lower. Specifically, by introducing silica particles in an amount of 0.1 mg or more and 10 mg or less into a pyrolysis gas chromatograph mass spectrometer, it is possible to check whether or not the silica particles contain a nitrogen element-containing compound from the MS spectrum of the detected peak.

Examples of components generated by pyrolysis from the silica particles containing a nitrogen element-containing compound include an amine represented by General Formula (N) having one or more and three or less C—N bonds and an aromatic nitrogen compound.

In General Formula (N), $R^{N1}$ to $R^{N3}$ each independently represent a hydrogen atom or an alkyl, aralkyl, or aryl group which may have a substituent. $R^{N1}$ to $R^{N3}$ have the same definition as $R^1$, $R^2$, and $R^3$ in General Formula (AM). For example, in a case where the nitrogen element-containing compound is a quaternary ammonium salt, some of the side chains thereof are detached by pyrolysis at 600° C., and the compound is detected as a tertiary amine.

General Formula (N)

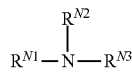

The increase in the pore volume of pores having a diameter of 1 nm or more and 50 nm or less determined from the pore size distribution curve of the nitrogen gas adsorption method before and after baking at 350° C. is specified as follows.

First, the rate of increase in the pore volume is, for example, represented by a ratio B/A of a pore volume B after baking at 350° C. to a pore volume A before baking at 350° C., which is 1.2 or more and 5 or less.

Specifically, the baking at 350° C. is carried out as follows.

In a nitrogen environment, the silica particles to be measured are heated to 350° C. at a heating rate of 10° C./min, and kept at 350° C. for 3 hours. Then, the silica particles are cooled to room temperature (25° C.) at a cooling rate of 10° C./min.

The pore volume of pores having a diameter of 1 nm or more and 50 nm or less is determined by the following method.

First, the silica particles to be measured are cooled to the temperature of liquid nitrogen (−196° C.), nitrogen gas is introduced, and the amount of nitrogen gas adsorbed is determined by a constant volume method or a gravimetric method. The pressure of nitrogen gas introduced is slowly increased, and the amount of nitrogen gas adsorbed is plotted for each equilibrium pressure, thereby creating an adsorption isotherm. From this adsorption isotherm, a pore size distribution curve in which the ordinate shows a frequency and the abscissa shows a pore diameter is obtained by the equation of the BJH method.

Then, from the obtained pore size distribution curve, an integrated pore volume distribution in which the ordinate shows a volume and the abscissa shows a pore diameter is obtained. From the obtained integrated pore volume distribution, an integral value of pore volumes of pores having a diameter in a range of 1 nm or more and 50 nm or less is calculated and adopted as "pore volume of pores having a diameter of 1 nm or more and 50 nm or less".

Number Average Particle Size and Number-Based Particle Size Distribution Index

The number average particle size of the silica particles according to the present exemplary embodiment is, for example, preferably 10 nm or more and 200 nm or less, more preferably 10 nm or more and 80 nm or less, and even more preferably 10 nm or more and 60 nm or less.

In a case where the number average particle size of silica particles is in the above range, the silica particles have a large specific surface area and are likely to be excessively charged. However, the silica particles according to the present exemplary embodiment can narrow the charge distribution even though the number average particle size thereof is in the above range.

The number-based particle size distribution index of the silica particles according to the present exemplary embodiment is, for example, preferably 1.1 or more and 2.0 or less, and more preferably 1.15 or more and 1.6 or less.

In a case where the number-based particle size distribution index of the silica particles according to the present exemplary embodiment is in the above range, the amount of coarse powder that tends to carry a large amount of charge and the amount of fine powder that tends to carry a small amount of charge are reduced, which makes it easy to narrow the charge distribution.

The number average particle size and the number-based particle size distribution index of the silica particles are measured as follows.

The silica particles are observed with a scanning electron microscope (SEM) at 40,000× magnification, the image of the observed silica particles is analyzed with image processing/analyzing software WinRoof (manufactured by MITANI Corporation), and equivalent circular diameters of at least 200 particles are calculated. Then, for the number of individual particles, a cumulative distribution is drawn from the number of small size particles, and a particle size below which the cumulative percentage of particles smaller than this size reaches 50% is determined as a number average particle size.

Furthermore, a square root of D84/D16 is defined as "number-based particle size distribution index" (GSD), wherein D84 is a particle size below which the cumulative percentage of particles smaller than this size reaches 84%, and D16 is a particle size below which the cumulative percentage of particles smaller than this size reaches 16%. That is, the number-based particle size distribution index (GSD)=(D84/D16)$^{0.5}$.

Circularity

The average circularity of the silica particles according to the present exemplary embodiment is, for example, preferably 0.60 or more and 0.96 or less, more preferably 0.70 or more and 0.94 or less, and even more preferably 0.70 or more and 0.92 or less.

In a case where the average circularity of silica particles is in the above range, the silica particles have a large specific surface area and are likely to be excessively charged. However, the silica particles according to the present exemplary embodiment can narrow the charge distribution even though the average circularity thereof is in the above range.

The circularity of silica particles is measured as follows.

Silica particles are observed with a scanning electron microscope (SEM) at 40,000× magnification, the image of the observed silica particles is analyzed with image processing/analyzing software WinRoof (manufactured by MITANI Corporation), the circularity of at least 200 particles is calculated, and an arithmetic mean thereof is calculated and adopted as the average circularity.

The circularity is calculated by the following equation.

$$\text{Circularity} = \text{Perimeter as equivalent circular diameter}/\text{Perimeter} = [2 \times (A\pi)^{1/2}]/PM$$

In the above equation, A represents a projected area, and PM represents a perimeter.

Manufacturing Method of Silica Particles

An example of the manufacturing method of the silica particles according to the present exemplary embodiment has a first step of forming a structure configured with a reaction product of a trifunctional silane coupling agent on the surface of silica base particles, and a second step of causing a nitrogen element-containing compound to be adsorbed onto at least a part of the structure.

The manufacturing method of the silica particles according to the present exemplary embodiment may further have a third step of hydrophobizing the silica base particles having a structure which covers at least a part of surface of the silica base particles and is configured with the reaction product of a trifunctional silane coupling agent, and in which the nitrogen element-containing compound is adsorbed onto at least a part of pores of the reaction product of a trifunctional silane coupling agent, after or during the second step.

Hereinafter, the steps of the manufacturing method of the silica particles according to the present exemplary embodiment will be specifically described.

Preparation Step

First, a step of preparing silica base particles will be described.

Examples of the preparation step include (i) step of mixing an alcohol-containing solvent with silica base particles so as to prepare a silica base particle suspension, (ii) step of granulating silica base particles by a sol-gel method so as to obtain a silica base particle suspension, and the like.

Examples of the silica base particles used in (i) include sol-gel silica particles (silica particles obtained by a sol-gel method), aqueous colloidal silica particles, alcoholic silica particles, fumed silica particles obtained by a gas phase method, molten silica particles, and the like.

The alcohol-containing solvent used in (i) may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, for example, the proportion of the alcohol is, for example, preferably 80% by mass or more, and more preferably 90% by mass or more.

A step (1-a) is preferably, for example, a step of granulating silica base particles by a sol-gel method so as to obtain a silica base particle suspension.

More specifically, the step (1-a) is, for example, preferably a sol-gel method including an alkali catalyst solution preparation step of preparing an alkali catalyst solution composed of an alcohol-containing solvent containing an alkali catalyst and a silica base particle generation step of supplying tetraalkoxysilane and an alkali catalyst to the alkali catalyst solution so as to generate silica base particles.

The alkali catalyst solution preparation step is, for example, preferably a step of preparing an alcohol-containing solvent and mixing the solvent with an alkali catalyst so as to obtain an alkali catalyst solution.

The alcohol-containing solvent may be a solvent composed only of an alcohol or a mixed solvent of an alcohol and other solvents. Examples of the alcohol include lower alcohols such as methanol, ethanol, n-propanol, isopropanol, and butanol. Examples of other solvents include water; ketones such as acetone, methyl ethyl ketone, and methyl isobutyl ketone; cellosolves such as methyl cellosolve, ethyl cellosolve, butyl cellosolve, and cellosolve acetate; ethers such as dioxane and tetrahydrofuran; and the like. In the case of the mixed solvent, for example, the proportion of the alcohol is, for example, preferably 80% by mass or more, and more preferably 90% by mass or more.

The alkali catalyst is a catalyst for accelerating the reaction of tetraalkoxysilane (a hydrolysis reaction and a condensation reaction). Examples thereof include basic catalysts such as ammonia, urea, and monoamine. Among these, for example, ammonia is particularly preferable.

The concentration of the alkali catalyst in the alkali catalyst solution is, for example, preferably 0.5 mol/L or more and 1.5 mol/L or less, more preferably 0.6 mol/L or more and 1.2 mol/L or less, and even more preferably 0.65 mol/L or more and 1.1 mol/L or less.

The silica base particle generation step is a step of supplying tetraalkoxysilane and an alkali catalyst to the alkali catalyst solution and reacting the tetraalkoxysilane (a hydrolysis reaction and condensation reaction) in the alkali catalyst solution so as to generate silica base particles.

In the silica base particle generation step, core particles are generated by the reaction of the tetraalkoxysilane at the early stage of supplying tetraalkoxysilane (core particle generation stage), and then silica base particles are generated through the growth of the core particles (core particle growth stage).

Examples of the tetraalkoxysilane include tetramethoxysilane, tetraethoxysilane, tetrapropoxysilane, tetrabutoxysilane, and the like. From the viewpoint of controlling the reaction rate or uniformity of the shape of the silica base particles to be generated, for example, tetramethoxysilane or tetraethoxysilane is preferable.

Examples of the alkali catalyst supplied to the alkali catalyst solution include basic catalysts such as ammonia, urea, monoamine, and a quaternary ammonium salt. Among these, for example, ammonia is particularly preferable. The alkali catalyst supplied together with the tetraalkoxysilane may, for example, be of the same type as or different type from the alkali catalyst contained in the alkali catalyst solution in advance. For example, it is preferable that the alkali catalysts be of the same type.

The method for supplying the tetraalkoxysilane and the alkali catalyst to the alkali catalyst solution may be a continuous supply method or an intermittent supply method.

In the silica base particle generation step, the temperature of the alkali catalyst solution (temperature at the time of supply) is, for example, preferably 5° C. or higher and 50° C. or lower, and more preferably 15° C. or higher and 45° C. or lower.

First Step

In the first step, a structure configured with a reaction product of a trifunctional silane coupling agent is formed.

Specifically, in the first step, for example, a trifunctional silane coupling agent is added to the silica base particle suspension, the trifunctional silane coupling agent is reacted on the surface of the silica base particles so that the structure configured with a reaction product of the trifunctional silane coupling agent is formed. The functional groups of the trifunctional silane coupling agent react with one another and with the OH groups on the surface of the silica particles. As a result, the structure configured with a reaction product of the trifunctional silane coupling agent is formed.

The reaction of the trifunctional silane coupling agent is carried out by adding the trifunctional silane coupling agent to the silica base particle suspension and then heating the suspension with stirring.

Specifically, for example, the suspension is heated to a temperature of 40° C. or higher and 70° C. or lower, a trifunctional silane coupling agent is added thereto, and then the mixture is stirred. The stirring is continued, for example, preferably for 10 minutes or more and 24 hours or less, more preferably for 60 minutes or more and 420 minutes or less, and even more preferably 80 minutes or more and 300 minutes or less.

Second Step

In the second step, a nitrogen element-containing compound is adsorbed onto at least a part of pores of the reaction product of a trifunctional silane coupling agent.

Specifically, in the second step, first, for example, a nitrogen element-containing compound is added to the silica base particle suspension, and the mixture is stirred, for example, in a temperature range of 20° C. or higher and 50° C. or lower. In this way, the nitrogen element-containing compound is adsorbed onto at least a part of the pores of the reaction product of a trifunctional silane coupling agent.

In the second step, for example, an alcohol solution containing a nitrogen element-containing compound may be added to the silica particle suspension.

The alcohol may, for example, be of the same type as or different type from the alcohol contained in the silica base particle suspension. For example, it is preferable that the alcohols be of the same type.

In the alcohol solution containing the nitrogen element-containing compound, for example, the concentration of the nitrogen element-containing compound is preferably 0.05% by mass or more and 10% by mass or less, and more preferably 0.1% by mass or more and 6% by mass or less.

Third Step

In the third step, after the second step or during the second step, the silica base particles having a structure which is configured with the reaction product of a trifunctional silane coupling agent and in which the nitrogen element-containing compound is adsorbed onto at least a part of the pores of the reaction product of a trifunctional silane coupling agent are hydrophobized.

Specifically, in the third step, for example, a nitrogen element-containing compound is added to the silica base particle suspension in which the aforementioned structure is formed, and then a hydrophobing agent is added thereto.

The functional groups of the hydrophobing agent react with one another and with the OH groups of the silica base particles, thereby forming a hydrophobic layer.

The reaction of the hydrophobing agent is carried out by adding the trifunctional silane coupling agent to the silica base particle suspension and then heating the suspension with stirring.

Specifically, for example, the suspension is heated to a temperature of 40° C. or higher and 70° C. or lower, a hydrophobing agent is added thereto, and then the mixture is stirred. The stirring is continued, for example, preferably for 10 minutes or more and 24 hours or less, more preferably for 20 minutes or more and 120 minutes or less, and even more preferably 20 minutes or more and 90 minutes or less.

Drying Step

In the manufacturing method of the silica particles according to the present exemplary embodiment, for example, it is preferable that a drying step of removing a solvent from the suspension be performed after the second step or the third step. The drying step may be carried out during the second step or third step.

Examples of the drying include heat drying, spray drying, and supercritical drying.

Spray drying can be performed by a conventionally known method using a commercially available spray dryer (including a rotary disk type and a nozzle type). For example, spray drying is performed by spraying a spray liquid in a hot air stream at a rate of 0.2 L/hour or more and 1 L/hour or less. At this time, the temperature of hot air is set so that, for example, the inlet temperature is preferably in a range of 70° C. or higher and 400° C. or lower and the outlet temperature is preferably in a range of 40° C. or higher and 120° C. or lower. In a case where the inlet temperature is lower than 70° C., the solids contained in the dispersion are not fully dried. In a case where the inlet temperature is higher than 400° C., the particle shape is distorted during the spray drying. Furthermore, in a case where the outlet temperature is lower than 40° C., the degree of drying of the solids is poor, and the solids adhere to the inside of the device. The inlet temperature is, for example, more preferably in a range of 100° C. or higher and 300° C. or lower.

The silica particle concentration in the silica particle suspension during the spray drying is, for example, preferably in a range of 10% by mass or more and 30% by mass or less in terms of solids.

During the supercritical drying, solvents are removed with a supercritical fluid. Therefore, surface tension between particles is difficult to work, and the primary particles contained in the suspension are dried while being inhibited from causing aggregation. Therefore, it is easy to obtain silica particles having a more uniform particle size.

Examples of the substance used as the supercritical fluid include carbon dioxide, water, methanol, ethanol, acetone, and the like. From the viewpoint of treatment efficiency and from the viewpoint of inhibiting the occurrence of coarse particles, it is preferable that the solvent removing step, for example, be a step of using supercritical carbon dioxide.

Specifically, the supercritical drying is performed by, for example, the following operation.

The suspension is put in an airtight reactor, and then liquefied carbon dioxide is introduced into the reactor. Thereafter, the airtight reactor is heated, and the internal pressure of the airtight reactor is raised using a high-pressure pump so that the carbon dioxide in the airtight reactor is in a supercritical state. Then, the liquefied carbon dioxide is caused to flow into the airtight reactor, and the supercritical carbon dioxide is discharged from the airtight reactor, so that the supercritical carbon dioxide circulates in the suspension in the airtight reactor. While the supercritical carbon dioxide is circulating in the suspension, the solvent dissolves in the supercritical carbon dioxide and is removed along with the supercritical carbon dioxide discharged from the airtight reactor.

The internal temperature and pressure of the airtight reactor are set so that the carbon dioxide is in a supercritical state. Because the critical point of carbon dioxide is 31.1° C./7.38 MPa, for example, the temperature is set to 40° C. or higher and 200° C. or lower, and the pressure is set to 10 MPa or higher and 30 MPa or lower.

The flow rate of the supercritical fluid in supercritical drying is, for example, preferably 80 mL/sec or more and 240 mL/sec or less.

It is preferable that the obtained silica particles, for example, be disintegrated or sieved as necessary so that coarse particles and aggregates are removed. The silica particles are disintegrated, for example, by a dry pulverizer such as a jet mill, a vibration mill, a ball mill, or a pin mill. The silica particles are sieved, for example, by a vibration sieve, an air sieve, or the like.

EXAMPLES

Hereinafter, exemplary embodiments of the invention will be specifically described based on examples. However, the exemplary embodiments of the invention are not limited to the examples. In the following description, unless otherwise specified, "%" are based on mass in all cases.

Manufacturing of Silica Particles

Examples 1, 3 to 25, 27 to 32 and Comparative Examples 1 to 4

Suspensions containing silica particles of each example are prepared in the following manner.

Preparation of Alkali Catalyst Solution

Methanol, deionized water, and 10% aqueous ammonia ($NH_4OH$) in the amount shown in Table 1 are put into a glass reactor equipped with a metal stirring rod, a dropping nozzle, and a thermometer, and stirred and mixed together, thereby obtaining an alkali catalyst solution.

Granulation of Silica Base Particles by Sol-Gel Method

The temperature of the alkali catalyst solution is adjusted to 40° C., and the alkali catalyst solution is subjected to nitrogen purging. Then, while the alkali catalyst solution is being stirred, tetramethoxysilane (TMOS) in the amount shown in Table 1 and 124 parts by mass of aqueous ammonia ($NH_4OH$) having a catalyst ($NH_3$) concentration of 7.9% are simultaneously added dropwise to the solution, thereby obtaining a silica base particle suspension.

Addition of Trifunctional Silane Coupling Agent

While the silica base particle suspension is being heated at 40° C. and stirred, the trifunctional silane coupling agent of the type and amount shown in Table 1 is added to the suspension. Then, the solution is kept stirred for 120 minutes so that the trifunctional silane coupling agent reacts. In this way, an adsorptive structure is formed.

Addition of Nitrogen Element-Containing Compound

The nitrogen element-containing compound of the type shown in Table 1 is diluted with butanol, thereby preparing an alcohol solution.

Then, the alcohol solution obtained by diluting the nitrogen element-containing compound with butanol is added to the suspension. At this time, the alcohol solution is added so that the number of parts of the nitrogen element-containing compound is as shown in Table 1 with respect to 100 parts by mass of the solids of the silica base particle suspension. Thereafter, the mixture is stirred at 30° C. for 100 minutes, thereby obtaining a suspension containing a nitrogen element-containing compound.

Drying

Subsequently, 300 parts by mass of the suspension is put in a reaction vessel, $CO_2$ is added with stirring, and the internal temperature and pressure of the reaction vessel are raised to the temperature and pressure shown in Table 1. In a state where the suspension is being stirred at the temperature and pressure kept as they are, $CO_2$ is caused to flow in and out of the reaction vessel at a flow rate of 5 L/min. Then, the solvent is removed for 120 minutes, thereby obtaining silica particles of each example.

Example 2

Silica particles are obtained in the same manner as in Example 1, except that spray drying is performed using a mini spray dryer B-290 (manufactured by NIHON BUCHI K.K.) under the condition where the silica particle suspension is fed at a liquid feeding rate of 0.2 L/hour, by setting the internal temperature and pressure of the cylinder as shown in Table 1.

Example 26

Silica particles are obtained in the same manner as in Example 1, except that after the addition of the nitrogen element-containing compound, hexamethyldisilazane (HMDS) is added in an amount of 50% by mass with respect to the solids of the silica base particles, the mixture is stirred at 65° C. for 3 hours so that the surface of the silica base particles is hydrophobized, and the amount of the nitrogen element-containing compound is set to 50 parts.

Evaluation

Various Characteristics

The following characteristics of the obtained silica particles are measured according to the method described above.

Number average particle size (described as "particle size" in the table)

Average circularity (described as "circularity" in the table)

Degree of hydrophobicity

Amount of OH groups measured by the Sears method (described as "OH group amount" in the table)

Volume resistivity

Peak position in pore size distribution curve of nitrogen gas adsorption method (described as "Pore size distribution curve·First peak position" and "Pore size distribution curve·Second peak position" in the table)

Charge Amount at Low Humidity and Charge Amount at High Humidity

The charge amount of the silica particles of each example at low humidity and high humidity is measured as follows.

The prepared silica particles (2% by mass) are added to the surface of MBX-12 manufactured by SEKISUI CHEMICAL CO., LTD., and 5 g of the obtained resultant and SPL-100 manufactured by UNITIKA LTD. weighing 50 g are mixed together. The obtained mixed sample is stirred for 2 minutes in a chamber at 10° C. and 10% RH with a tubular shaker, the charge is measured using TB200 manufactured by TOSHIBA CORPORATION, and the result is denoted by FC. Furthermore, the same sample is stirred for 2 minutes in a chamber at 30° C. and 90% RH with a tubular shaker, the charge is measured using TB200 manufactured by TOSHIBA CORPORATION, and the result is denoted by FA. The environmental dependence of capacitance is evaluated using a ratio of FA/FC (ratio of charge amount at high humidity/charge amount at low humidity).

G1 (◉) FA/FC (ratio of charge amount at high humidity/charge amount at low humidity) is 0.8 or more and less than 1.1.

G2 (○): FA/FC (ratio of charge amount at high humidity/charge amount at low humidity) is 0.65 or more and less than 0.8.

G3 (Δ): FA/FC (ratio of charge amount at high humidity/charge amount at low humidity) is 0.5 or more and less than 0.65.

G4 (×): FA/FC (ratio of charge amount at high humidity/charge amount at low humidity) is less than 0.5.

Charge Distribution in High-Temperature and High-Humidity Environment

The charge distribution of the silica particles in each example is evaluated as follows.

The prepared silica particles (2% by mass) are added to the surface of MBX-12 manufactured by SEKISUI CHEMICAL CO., LTD., and 5 g of the obtained resultant and SPL-100 manufactured by UNITIKA LTD. weighing 50 g are mixed together. The obtained mixed sample is stirred for 2 minutes in a chamber at 30° C. and 90% RH with a tubular shaker, and the charge distribution is evaluated by image analysis of CSG (charge spectrography). The charge distribution is defined as a value obtained by dividing the difference between a charge amount Q(20) accounting for an integrated cumulative percentage of 20% in the charge distribution and a charge amount Q(80) accounting for an integrated cumulative percentage of 80% in the charge distribution by a charge amount Q(50) accounting for an integrated cumulative percentage of 50% in the charge distribution. That is, the charge distribution is defined as [Q(80)–Q(20)]/Q(50). The evaluation criteria are as follows.

G1 (◉): The value of [Q(80)–Q(20)]/Q(50) is less than 0.7.

G2 (○): The value of [Q(80)–Q(20)]/Q(50) is less than 0.8 and 0.7 or more.

G3 (Δ): The value of [Q(80)–Q(20)]/Q(50) is less than 1.0 and 0.8 or more.

G4 (×): The value of [Q(80)–Q(20)]/Q(50) is 1.0 or more. The evaluation results are shown in Table 1.

Details of the abbreviations in Table 1 are as follows.

MTMS: methyltrimethoxysilane

DTMS: n-dodecyltrimethoxysilane

TP-415: [N$^+$(CH$_3$)($C_{14}C_{29}$)$_2$]$_4$ Mo$_8$O$_{28}$$^{4-}$ (manufactured by Hodogaya Chemical Co., Ltd., N,N-Dimethyl-N-tetradecyl-1-tetradecanaminium, hexa-µ-oxotetra-µ3-oxodi-µ5-oxotetradecaoxooctamolybdate (4–)(4:1)), (Extraction amount X by ammonia/methanol mixed solution=61% to 89% by mass, ratio X/Y of extraction amount X to extraction amount Y=0.03 to 0.26)

P51: "BONTRON P51" manufactured by ORIENT CHEMICAL INDUSTRIES CO., LTD, benzyltributylammonium 4-hydroxynaphthalene-1-sulfonate represented by the following formula, (extraction amount X by a mixed solution of ammonia/methanol=0.78% by mass, ratio X/Y of extraction amount X to extraction amount Y by water=0.19)

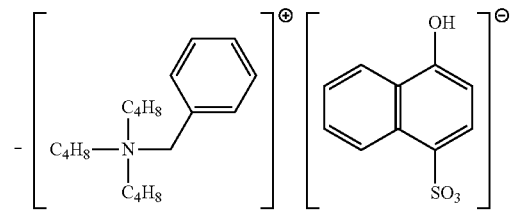

Tridecylamine (extraction amount X by mixed solution of ammonia/methanol=66% by mass, ratio X/Y of extraction amount X to extraction amount Y by water=0.19)

Dimethyloctadecyl [3-(trimethoxysilyl)propyl]ammonium chloride

Aminopropyltrimethoxysilane (extraction amount X by mixed solution of ammonia/methanol=78% by mass, ratio X/Y of extraction amount X to extraction amount Y by water=0.16)

Quotanium-80 (extraction amount X by mixed solution of ammonia/methanol=80% by mass, ratio X/Y of extraction amount X to extraction amount Y by water=0.09)

Ditetrakis (dibutyldibenzylammonium) molybdate (extraction amount X by mixed solution of ammonia/methanol=65% by mass, ratio X/Y of extraction amount X to extraction amount Y by water=0.15)

Phenethylamine (extraction amount X by mixed solution of ammonia/methanol=55% by mass, ratio X/Y of extraction amount X to extraction amount Y by water=0.28)

4-(2-Octylamino)diphenylamine (extraction amount X by mixed solution of ammonia/methanol=78% by mass, ratio X/Y of extraction amount X to extraction amount Y by water=0.14)

N-benzyl-N-methylethanolamine (extraction amount X by mixed solution of ammonia/methanol=58% by mass, ratio X/Y of extraction amount X to extraction amount Y by water=0.27)

2,3-Bis(2,6-diisopropylphenylimino)butane (extraction amount X by mixed solution of ammonia/methanol=81% by mass, ratio X/Y of extraction amount X to extraction amount Y by water=0.11)

3-Indoleacetonitrile (extraction amount X by mixed solution of ammonia/methanol=80% by mass, ratio X/Y of extraction amount X to extraction amount Y by water=0.12)

TABLE 1-1

| | Granulation of silica base particles | | | | | | Addition of trifunctianal silane coupling agent | |
|---|---|---|---|---|---|---|---|---|
| | | Methanol | Water | 10% aqueous ammonia | Silane alkoxide | | Trifunctianal silane coupling agent | |
| | Granulation method | Amount [g] | Amount [g] | Amount [g] | Type | Amount [parts] | Type | Amount [parts] |
| Example 1 | Sol-gel method | 900 | 63 | 7.0 | TMOS | 850 | MTMS | 50 |
| Example 2 | Sol-gel method | 900 | 63 | 7.0 | TMOS | 850 | MTMS | 50 |
| Example 3 | Sol-gel method | 900 | 63 | 7.0 | TMOS | 850 | MTMS | 22 |
| Example 4 | Sol-gel method | 900 | 63 | 7.0 | TMOS | 850 | MTMS | 190 |
| Example 5 | Sol-gel method | 900 | 34 | 7.0 | TMOS | 850 | MTMS | 220 |
| Example 6 | Sol-gel method | 900 | 76 | 8.0 | TMOS | 850 | MTMS | 22 |
| Example 7 | Sol-gel method | 900 | 63 | 7.0 | TMOS | 850 | MTMS | 40 |
| Example 8 | Sol-gel method | 900 | 63 | 7.0 | TMOS | 850 | MTMS | 70 |
| Example 9 | Sol-gel method | 900 | 84 | 7.0 | TMOS | 850 | MTMS | 20 |
| Example 10 | Sol-gel method | 900 | 84 | 7.0 | TMOS | 850 | MTMS | 20 |
| Example 11 | Sol-gel method | 900 | 63 | 7.0 | TMOS | 850 | Octyltrimethoxysilane | 50 |
| Example 12 | Sol-gel method | 900 | 63 | 7.0 | TMOS | 850 | Decyltrimethoxysilane | 50 |
| Example 13 | Sol-gel method | 900 | 42 | 4.0 | TMOS | 382.5 | MTMS | 100 |
| Example 14 | Sol-gel method | 900 | 84 | 8.0 | TMOS | 850 | MTMS | 50 |
| Example 15 | Sol-gel method | 900 | 93 | 13.0 | TMOS | 850 | MTMS | 50 |
| Example 16 | Sol-gel method | 900 | 21 | 2.0 | TMOS | 850 | MTMS | 50 |
| Example 17 | Sol-gel method | 900 | 27 | 3.0 | TMOS | 850 | MTMS | 50 |
| Example 18 | Sol-gel method | 900 | 84 | 8.0 | TMOS | 850 | MTMS | 50 |
| Example 19 | Sol-gel method | 900 | 63 | 7.0 | TMOS | 850 | DTMS | 50 |
| Example 20 | Gas phase method | — | — | — | — | — | MTMS | 50 |
| Example 21 | Sol-gel method | 900 | 63 | 7.0 | TMOS | 850 | MTMS | 50 |
| Example 22 | Sol-gel method | 900 | 63 | 7.0 | TMOS | 850 | MTMS | 50 |
| Example 23 | Sol-gel method | 900 | 63 | 7.0 | TMOS | 850 | MTMS | 50 |
| Example 24 | Sol-gel method | 900 | 63 | 7.0 | TMOS | 850 | MTMS | 50 |
| Example 25 | Sol-gel method | 900 | 63 | 7.0 | TMOS | 850 | MTMS | 50 |
| Example 26 | Sol-gel method | 900 | 63 | 7.0 | TMOS | 850 | MTMS | 50 |
| Example 27 | Sol-gel method | 900 | 63 | 7.0 | TMOS | 850 | MTMS | 50 |
| Example 28 | Sol-gel method | 900 | 63 | 7.0 | TMOS | 850 | MTMS | 50 |
| Example 29 | Sol-gel method | 900 | 63 | 7.0 | TMOS | 850 | MTMS | 50 |
| Example 30 | Sol-gel method | 900 | 63 | 7.0 | TMOS | 850 | MTMS | 50 |
| Example 31 | Sol-gel method | 900 | 63 | 7.0 | TMOS | 850 | MTMS | 50 |
| Example 32 | Sol-gel method | 900 | 63 | 7.0 | TMOS | 850 | MTMS | 50 |
| Comparative Example 1 | Sol-gel method | 900 | 63 | 6.7 | TMOS | 850 | MTMS | 20 |
| Comparative Example 2 | Sol-gel method | 900 | 63 | 6.7 | TMOS | 850 | MTMS | 3 |
| Comparative Example 3 | Sol-gel method | 900 | 63 | 6.7 | TMOS | 850 | MTMS | 250 |

TABLE 1-1-continued

| | | | | | | | | | |
|---|---|---|---|---|---|---|---|---|---|
| Comparative Example 4 | Sol-gel method | 900 | 63 | 6.7 | TMOS | 850 | MTMS | | 0 |

| | Addition of nitrogen element-containing compound Nitrogen element-containing compound | | Hydrophobing agent | | Drying step | | |
|---|---|---|---|---|---|---|---|
| | Type | Amount [parts] | type | Mass [parts] | Drying method | Temperature ° C. | Pressure Mpa |
| Example 1 | TP-415 | 5 | — | — | Supercritical drying | 150 | 15 |
| Example 2 | TP-415 | 2 | — | — | Spray drying | 100 | 0.1 |
| Example 3 | TP-415 | 1 | — | — | Supercritical drying | 150 | 15 |
| Example 4 | TP-415 | 45 | — | — | Supercritical drying | 150 | 15 |
| Example 5 | TP-415 | 5 | — | — | Supercritical drying | 150 | 15 |
| Example 6 | TP-415 | 5 | — | — | Supercritical drying | 150 | 15 |
| Example 7 | TP-415 | 23 | — | — | Supercritical drying | 150 | 15 |
| Example 8 | TP-415 | 0.53 | — | — | Supercritical drying | 150 | 15 |
| Example 9 | TP-415 | 5 | — | — | Supercritical drying | 150 | 15 |
| Example 10 | TP-415 | 5 | — | — | Supercritical drying | 150 | 15 |
| Example 11 | TP-415 | 0.5 | — | — | Supercritical drying | 150 | 15 |
| Example 12 | TP-415 | 5 | — | — | Supercritical drying | 150 | 15 |
| Example 13 | TP-415 | 10 | — | — | Supercritical drying | 150 | 15 |
| Example 14 | TP-415 | 4 | — | — | Supercritical drying | 150 | 15 |
| Example 15 | TP-415 | 4 | — | — | Supercritical drying | 150 | 15 |
| Example 16 | TP-415 | 4 | — | — | Supercritical drying | 150 | 15 |
| Example 17 | TP-415 | 4 | — | — | Supercritical drying | 150 | 15 |
| Example 18 | TP-415 | 4 | — | — | Supercritical drying | 150 | 15 |
| Example 19 | TP-415 | 5 | — | — | Supercritical drying | 150 | 15 |
| Example 20 | TP-415 | 5 | — | — | Supercritical drying | 150 | 15 |
| Example 21 | P51 | 2 | — | — | Supercritical drying | 150 | 15 |
| Example 22 | Tridecylamine | 2 | — | — | Supercritical drying | 150 | 15 |
| Example 23 | Dimethyloctadecyl [3-(trimethoxysilyl)propyl]ammonium chloride | 4 | — | — | Supercritical drying | 150 | 15 |
| Example 24 | Aminopropyltrimethoxysilane | 2 | — | — | Supercritical drying | 150 | 15 |
| Example 25 | Quotanium-80 | 10 | — | — | Supercritical drying | 150 | 15 |
| Example 26 | TP-415 | 4 | HMDS | 50 | Supercritical drying | 150 | 15 |
| Example 27 | Ditetrakis(dibutyldibenzylammonium) molybdate | 5 | — | — | Supercritical drying | 150 | 15 |
| Example 28 | Phenethylamine | 5 | — | — | Supercritical drying | 150 | 15 |
| Example 29 | 4-(2-Octylamino)diphenylamine | 5 | — | — | Supercritical drying | 150 | 15 |
| Example 30 | N-benzyl-N-methylethanolamine | 5 | — | — | Supercritical drying | 150 | 15 |
| Example 31 | 2,3-Bis(2,6-diisopropylphenylimino)butane | 5 | — | — | Supercritical drying | 150 | 15 |
| Example 32 | 3-Indolacetonitrile | 5 | — | — | Supercritical drying | 150 | 15 |
| Comparative Example 1 | TP-415 | 0.1 | — | — | Supercritical drying | 150 | 15 |

TABLE 1-1-continued

| | | | | | | | |
|---|---|---|---|---|---|---|---|
| Comparative Example 2 | Tridecylamine | 0.8 | — | — | Supercritical drying | 150 | 15 |
| Comparative Example 3 | Tridecylamine | 0.53 | — | — | Supercritical drying | 150 | 15 |
| Comparative Example 4 | Tridecylamine | 0.53 | — | — | Supercritical drying | 150 | 15 |

TABLE 1-2

| | Particle characteristics | | | | | | |
|---|---|---|---|---|---|---|---|
| | Particle size nm | Circularity — | Degree of hydrophobicity % | OH group amount Number of OH groups/nm^2 | Volume resistivity Ωcm (10^X) | Pore size distribution curve First peak position nm | Pore size distribution curve Second peak position nm |
| Example 1 | 60 | 0.88 | 47 | 2.9 | 10.0 | 0.6 | 3 |
| Example 2 | 62 | 0.89 | 48 | 3.9 | 9.5 | 0.7 | 3 |
| Example 3 | 63 | 0.89 | 28 | 5.4 | 11.0 | 0.6 | 2 |
| Example 4 | 62 | 0.87 | 55 | 0.3 | 10.9 | 0.6 | 20 |
| Example 5 | 61 | 0.87 | 58 | 0.05 | 10.1 | 0.7 | 20 |
| Example 6 | 62 | 0.88 | 26 | 5.0 | 8.2 | 0.6 | 2 |
| Example 7 | 63 | 0.86 | 41 | 3.0 | 8.0 | 0.6 | 3 |
| Example 8 | 63 | 0.86 | 49 | 2.5 | 12.5 | 0.6 | 3 |
| Example 9 | 60 | 0.91 | 22.00 | 4.9 | 8.2 | 0.4 | 1.2 |
| Example 10 | 60 | 0.92 | 23.00 | 4.8 | 8.1 | 0.3 | 1.5 |
| Example 11 | 61 | 0.88 | 49 | 3.4 | 10.7 | 0.6 | 50 |
| Example 12 | 60 | 0.87 | 45 | 3.4 | 10.9 | 0.7 | 53 |
| Example 13 | 10 | 0.76 | 57 | 0.6 | 10.8 | 0.01 | 2 |
| Example 14 | 80 | 0.9 | 44 | 4.2 | 10.3 | 1.0 | 3 |
| Example 15 | 200 | 0.92 | 44 | 4.4 | 10.1 | 2.0 | 15 |
| Example 16 | 61 | 0.6 | 46 | 0.3 | 11.0 | 1.0 | 20 |
| Example 17 | 61 | 0.7 | 48 | 0.5 | 11.1 | 0.9 | 15 |
| Example 18 | 61 | 0.96 | 49 | 3.5 | 10.0 | 0.3 | 3 |
| Example 19 | 62 | 0.88 | 41 | 3.4 | 10.9 | 0.7 | 3 |
| Example 20 | 39 | 0.7 | 30 | 0.23 | 11.4 | 0.4 | 5 |
| Example 21 | 61 | 0.85 | 48 | 3.2 | 10.2 | 0.6 | 10 |
| Example 22 | 60 | 0.86 | 49 | 3.4 | 10.5 | 0.7 | 3 |
| Example 23 | 61 | 0.87 | 51 | 3.2 | 10.7 | 0.7 | 3 |
| Example 24 | 61 | 0.86 | 50 | 3.3 | 10.3 | 0.7 | 3 |
| Example 25 | 60 | 0.87 | 48 | 3.3 | 10.1 | 0.8 | 3 |
| Example 26 | 60 | 0.86 | 60 | 1.5 | 11.4 | 1.0 | 5 |
| Example 27 | 60 | 0.88 | 46 | 2.8 | 10.2 | 0.8 | 4 |
| Example 28 | 60 | 0.88 | 49 | 2.7 | 10.6 | 0.7 | 3 |
| Example 29 | 60 | 0.88 | 46 | 2.8 | 10.5 | 0.6 | 4 |
| Example 30 | 60 | 0.88 | 49 | 2.9 | 10.3 | 0.7 | 3 |
| Example 31 | 60 | 0.88 | 49 | 2.6 | 10.5 | 0.6 | 3 |
| Example 32 | 60 | 0.88 | 46 | 2.8 | 10.2 | 0.8 | 4 |
| Comparative Example 1 | 66 | 0.88 | 23 | 5 | 11.0 | 0.6 | 3 |
| Comparative Example 2 | 64 | 0.87 | 0 | 5.4 | 10.5 | 0.6 | 3 |
| Comparative Example 3 | 61 | 0.85 | 58 | 0.04 | 12.6 | 0.7 | 20 |
| Comparative Example 4 | 61 | 0.85 | 0 | 6.0 | 7.5 | 0.7 | No second peak |

| | N-containing compound Content (in terms of N atoms) % by mass | Evaluation | | | |
|---|---|---|---|---|---|
| | | Charge amount at high humidity μC | Charge amount at low humidity μC | Ratio of charge amount at high huridty/charge amount at low humidity — | Charge distribution at high temperature and high humidity — |
| Example 1 | 0.040 | 25.7 | 30.2 | G1(◉) | G1(◉) |
| Example 2 | 0.014 | 22.4 | 27.8 | G1(◉) | G1(◉) |
| Example 3 | 0.009 | 23.7 | 35.0 | G2(○) | G2(○) |
| Example 4 | 0.371 | 30.2 | 32.3 | G1(◉) | G1(◉) |
| Example 5 | 0.039 | 30.1 | 33.5 | G1(◉) | G2(○) |
| Example 6 | 0.041 | 25.1 | 27.3 | G1(◉) | G2(○) |

TABLE 1-2-continued

| | | | | | |
|---|---|---|---|---|---|
| Example 7 | 0.168 | 23.5 | 26.1 | G1(◉) | G1(◉) |
| Example 8 | 0.005 | 26.6 | 38.2 | G2(○) | G2(○) |
| Example 9 | 0.040 | 22.5 | 26.5 | G1(◉) | G1(◉) |
| Example 10 | 0.038 | 23.2 | 27.2 | G1(◉) | G1(◉) |
| Example 11 | 0.006 | 30.5 | 37.5 | G1(◉) | G1(◉) |
| Example 12 | 0.042 | 32.0 | 38.1 | G1(◉) | G2(○) |
| Example 13 | 0.083 | 33.2 | 35.1 | G1(◉) | G1(◉) |
| Example 14 | 0.030 | 24.2 | 30.0 | G1(◉) | G1(◉) |
| Example 15 | 0.030 | 21.6 | 29.1 | G2(○) | G2(○) |
| Example 16 | 0.032 | 27.7 | 37.8 | G2(○) | G1(◉) |
| Example 17 | 0.031 | 28.8 | 37.2 | G2(○) | G2(○) |
| Example 18 | 0.031 | 23.6 | 29.9 | G2(○) | G2(○) |
| Example 19 | 0.042 | 32.5 | 38.1 | G1(◉) | G1(◉) |
| Example 20 | 0.029 | 26.8 | 39.1 | G2(○) | G2(○) |
| Example 21 | 0.030 | 21.2 | 22.5 | G1(◉) | G2(○) |
| Example 22 | 0.032 | 21.3 | 23.5 | G1(◉) | G2(○) |
| Example 23 | 0.040 | 21.3 | 28.5 | G2(○) | G2(○) |
| Example 24 | 0.043 | 22.3 | 24.2 | G2(○) | G2(○) |
| Example 25 | 0.034 | 21.5 | 29.5 | G2(○) | G1(◉) |
| Example 26 | 0.040 | 24.8 | 30.5 | G1(◉) | G2(○) |
| Example 27 | 0.092 | 25.3 | 38.1 | G2(○) | G1(◉) |
| Example 28 | 0.453 | 22.8 | 35.8 | G2(○) | G2(○) |
| Example 29 | 0.218 | 26 | 36.0 | G2(○) | G2(○) |
| Example 30 | 0.412 | 25.5 | 37.1 | G2(○) | G2(○) |
| Example 31 | 0.172 | 25.9 | 38.5 | G2(○) | G2(○) |
| Example 32 | 0.438 | 25.7 | 35.9 | G2(○) | G2(○) |
| Comparative Example 1 | 0.001 | 22.1 | 52.5 | G4(X) | G4(X) |
| Comparative Example 2 | 0.070 | 23.5 | 38.4 | G2(○) | G4(X) |
| Comparative Example 3 | 0.041 | 27.6 | 39.1 | G2(○) | G4(X) |
| Comparative Example 4 | 0.03 | 23.1 | 35 | G2(○) | G4(X) |

The above results show that the silica particles of examples have a narrower charge distribution when charged, compared to silica particles of comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Silica particles comprising:
   silica base particles;
   a structure that covers at least a part of a surface of the silica base particles and is configured with a reaction product of a trifunctional silane coupling agent; and
   a nitrogen element-containing compound,
   wherein a content of the nitrogen element-containing compound with respect to the silica particles is 0.005% by mass or more and 0.50% by mass or less in terms of N atoms,
   the silica particles have a degree of hydrophobicity of 10% or more and 60% or less and a volume resistivity of $1\times10^8$ Ω·cm or more and $1\times10^{12.5}$ Ω·cm or less, and
   wherein in a pore size distribution curve of the silica particles obtained by a nitrogen gas adsorption method, a first peak appears in a range of a pore diameter of 0.01 nm or more and 2 nm or less and a second peak appears in a range of a pore diameter of 1.5 nm or more and 50 nm or less.

2. The silica particles according to claim 1,
   wherein the nitrogen element-containing compound is adsorbed onto at least a part of pores of the reaction product of the trifunctional silane coupling agent.

3. The silica particles according to claim 1,
   wherein the silica particles have the degree of hydrophobicity of 10% or more and 50% or less.

4. The silica particles according to claim 1,
   wherein the silica particles have a volume average particle size of 10 nm or more and 200 nm or less.

5. The silica particles according to claim 4,
   wherein the silica particles have a volume average particle size of 10 nm or more and 80 nm or less.

6. The silica particles according to claim 1,
   wherein the silica particles have an average circularity of 0.60 or more and 0.96 or less.

7. The silica particles according to claim 6,
   wherein the silica particles have an average circularity of 0.70 or more and 0.92 or less.

8. The silica particles according to claim 1,
   wherein the nitrogen element-containing compound is at least one compound selected from the group consisting of a quaternary ammonium salt, a primary amine compound, a secondary amine compound, a tertiary amine compound, an amide compound, an imine compound, and a nitrile compound.

* * * * *